United States Patent [19]

Stoy

[11] 4,337,327
[45] Jun. 29, 1982

[54] NOVEL BLOCK COPOLYMERS INCLUDING ACRYLONITRILE SEQUENCES AND SEQUENCES INCLUDING UNITS DERIVED FROM GLUTARIMIDE UNITS AND PROCESSES FOR PREPARING SAME

[75] Inventor: Vladimir A. Stoy, Princeton, N.J.

[73] Assignee: S.K.Y. Polymers, Inc., N.J.

[21] Appl. No.: 188,060

[22] Filed: Sep. 17, 1980

Related U.S. Application Data

[63] Continuation-in-part of Ser. No. 166,032, Jul. 7, 1980.

[51] Int. Cl.³ .................... C08F 220/48; C08F 293/00
[52] U.S. Cl. ...................................... 525/280; 525/294; 525/336; 525/374; 525/376; 525/379; 525/380; 525/384
[58] Field of Search ............... 525/294, 296, 336, 374, 525/377, 376, 380, 379, 384, 280

[56] References Cited

U.S. PATENT DOCUMENTS

| | | | |
|---|---|---|---|
| 2,940,952 | 6/1960 | Miller | 525/294 |
| 3,897,382 | 7/1975 | Stoy et al. | 525/336 |
| 3,926,930 | 12/1975 | Ohfuka et al. | 525/377 |
| 3,948,870 | 4/1976 | Stoy et al. | 525/336 |

Primary Examiner—Carman J. Seccuro
Attorney, Agent, or Firm—Louis E. Marn; Elliot M. Olstein

[57] ABSTRACT

There is disclosed novel block copolymers formed of acrylonitrile sequences and sequences containing at least about 50 mole percent of acrylamide units and at most about 50 of units selected from the group consisting of carboxyl, ester, amide, hydrazide and hydroxylamide units and formed by reacting a block copolymer having acrylonitrile sequences and sequences of glutarimide units with a low molecular weight compound having a functional group selected from the group consisting of hydroxyl, primary amino, secondary amino, hydrazo and hydroxylamino group. The reaction is effected at a pH of about 7.5 and higher, preferably in the presence of a solvent and/or swelling agent.

15 Claims, No Drawings

નોvel BLOCK COPOLYMERS INCLUDING ACRYLONITRILE SEQUENCES AND SEQUENCES INCLUDING UNITS DERIVED FROM GLUTARIMIDE UNITS AND PROCESSES FOR PREPARING SAME This is a continuation-in-part of application Ser. No. 166,032 filed July 7, 1980 pending.

FIELD OF INVENTION

This invention relates to novel block copolymers including acrylonitrile sequences, and more particularly to novel block copolymers comprised of acrylonitrile sequences and sequences including as a major portion units derived from glutarimide units and processes for preparing same.

BACKGROUND OF THE INVENTION

In copending application U.S. Ser. No. 188,224 filed Sept. 17, 1980 allowed, there are disclosed novel block copolymers compositions comprised of acrylonitrile sequences and sequences of glutarimide units of a molecular weight of from about 10,000 to about 2,000,000 where the acrylonitrile sequences and sequences including glutarimide units are of a molecular weight of at least about 400 with the number of sequences being at least about 2 and preferably 5 and higher. The resulting block copolymers are relatively stable with regard to acids even at elected temperatures, but are reactive to basic materials.

OBJECTS OF THE INVENTION

An object of the present invention is to provide novel block copolymers.

Another object of the present invention is to provide novel block copolymers having acrylonitrile sequences and sequences including units derived from glutarimide units.

Still another object of the present invention is to provide novel block copolymers having acrylonitrile sequences and sequences including units derived from glutarimide units yielding swellable but water insoluable hydrogels.

Still another object of the present invention is to provide novel processes for preparing such novel block copolymers.

SUMMARY OF THE INVENTION

These and other objects of the present invention are achieved by reacting a block copolymer having acrylonitrile sequences and sequences of glutarimide units with a low molecular weight compound having a functional group selected from the group consisting of hydroxyl, primary amino, secondary amino, hydrazo and hydroxylamino group, and to form novel block copolymers having acylonitrile sequences and sequences containing at least about 50 mole percent of acrylamide units and at most about 50 of units selected from the group consisting of carboxyl, ester, amide, hydrazide and hydroxylamide units. The reaction is effected at a pH of about 7.5 and higher, preferably in the presence of a solvent and/or swelling agent.

BRIEF DESCRIPTION OF THE INVENTION

As described in the aforementioned copending application (P/12245), the precursor block copolymers are comprised of acrylonitrile sequences and sequences including glutarimide units and of a molecular weight of from about 10,000 to about 2,000,000 where the acrylonitrile sequences and sequences including glutarmide units are of a molecular weight of at least 40 with the number of sequences being at least about 2 and preferably 5 and higher. Such block copolymers essentially a two phase structure with an acrylonitrile and glutarimide domains wherein the acrylonitrile and the glutarimide domains exhibit an amorphous structure.

An acrylonitrile sequence is a continuous sequence of acrylonitrile units of a molecular weight of at least about 400, and preferably of at least about 600. The sequences including a major portion of glutarimide units is a continuous sequence having a molecular weight of at least about 400 and preferably at least about 750. The number of sequences per polymer chain is at least 2 and perferable from 5 or more.

The novel block copolymer compositions of the present invention are readily prepared by treating the precursor block copolymers having acrylonitrile sequences and sequences comprised of a major portion of glutarimide units with a low molecular weight compound having a functional group selected from the group consisting of hydroxyl, primary amino, secondary amino, hydrazo and hydroxylamino group at a temperature of from about 0° to about 185° C., preferably of from 15° to 65° C. to form block copolymers having acrylonitrile sequences and sequences containing at least about 50 mole percent acrylamide units and at most about 50 mole percent of units selected from the group consisting of carboxyl, ester, amide, hydrazide and hydroxylamide units.

The reaction is effected at a pH of 7.5 or greater, preferable in the presence of a solvent and/or swelling agent for the precursor block copolymer. Reaction times are from about 1 to 600 minutes, preferable 10 to 120 minutes.

The reactions are carried out under mild conditions at which the $-CN$ groups are not reactive thereby resulting in novel block copolymers wherein the acrylonitrile sequences thereof are of like acrylonitrile sequences of the precursor block copolymer. Thus, the glutarimide units are converted to acrylamide and units selected from the group consisting of carboxyl, ester, amide, hydrazide and hydroxylamide units with the result that the flexible portion of the precursor block copolymer is convered to a major portion of hydrophobic groups i.e. effectively a hydrogel multiblock copolymer. An essential feature of the block copolymers of the present invention is that at least one acrylamide unit is in a closest vicinity to the aforementioned other units.

The conversion of the hydrophobic block copolymers into hydrogels permits utilization thereof by the attendant shape charge when in contact with water, such as:

1. Forming hydrogel layers on hydrophobic blocks copolymers for use to decrease drag in tubes, on propellers of ships, and for forming slippery layers on catheters, sound and other medical devices.

2. Sealing sand or soil by introducing powdered precursor block copolymer into such a substrat and thereafter converting the block copolymer to hydrogel particles by adding an alkali thereto.

3. Incorporating highly reactive groups into hydrogels where such reactive groups are effective in immobilizing enzymes.

The properties of the novel block copolymers are preselectable by varying the mole percent of acrylonitrile units to glutarimide units of the precursor block copolymers as well as by varying the number and the molecular weight of the sequences.

Recovery of the block copolymers of the present invention may be effected in a plurality of ways depending on the reaction system in which the novel block copolymers are formed. If the alkali is sufficiently volatile, the block copolymer is recovered by evaporation of the alkali, such as ammonia. The block copolymers are readily extracted from the reaction systems with a liquid miscible therewith but immiscible with the dissolved block copolymers. Such miscible liquids include water, aqueous solutions, low aliphatic alcohols, ketones, glycols and the like. The block copolymers may be recovered by neutralization of the alkali.

EXAMPLES OF THE INVENTION

The following examples are illustrative of conditions for the process of the present invention and it is to be understood that the scope of the invention is not to be limited thereby.

EXAMPLE I

A multiblock acrylonitrile-glutarimide-acrylamide copolymer of the following composition: 57.4 percent by weight of acrylonitrile units arranged into the sequences with average molecular weight of about 1,500, 33.2 percent by weight of glutarimide units and 9.4 percent by weight of acrylamide units arranged randomly into sequences with an average molecular weight of 1110, is admixed with an excess of 2-animoethanol and maintained at 20° C. After several hours, the resulting swollen mass is filtered and washed with methanol and had the following composition: 61 mole percent of acrylonitrile units, 9.8 mole percent of acrylamide units and 29.2 mole percent of 2-hydroxyl-ethyl-N-acrylamide. The resulting block copolymer is a water swellable multiblock hydrogel showing the typical x-ray pattern of polyacrylonitrile with an amorphous halo.

EXAMPLE II

A solution of multiblock acrylonitrile-glutarimide-acrylamide copolymer of the following composition: 57.4 percent by weight of acrylonitrile units arranged into sequences with average molecular weight of about 1,500, 33.2 percent by weight of glutarimide units and 9.4 percent by weight of acrylamide units arranged randomly into sequences with an average molecular weight of 1110, is heated to 75° C. and bubbled with dry air to remove HCl whereupon gaseous ammonia is introduced at a partial pressure of 1.2 atmospheres for two hours. The solution is subjected to air bubbling at ambient pressure and thereafter coagulated with water and formed an acrylonitrile-acrylamide hydrogel comprised of 61.8 mole percent acrylonitrile and 38.2 mole percent acrylamide. Thus illustrated a method of eliminating carboxylic groups from an acrylonitrile-acrylamide-acrylic acid hydrogel.

EXAMPLE III

A solution of a multiblock acrylonitrile-glutarimide-acrylamide copolymer of the following composition: 57.4 percent by weight of acrylonitrile units arranged into the sequences with average molecular weight of about 1,500, 33.2 percent by weight of glutarimide units and 9.4 percent by weight of acrylamide units arranged randomly into sequences with an average molecular weight of 1110, is heated to 75° C. and bubbled with dry air to remove HCl whereupon gaseous dimethylamine is introduced for a period of 6 hours with the solution being maintained at a temperature of 30° C. The resulting block copolymer is comprised of 62 mole percent of acrylonitrile, 8.7 mole percent acrylamide and 29.3 mole percent of N,N-dimethylacrylamide.

EXAMPLE IV

Polyacrylonitrile (M.W.=875,000) is dissolved in an aqueous solution of sodium rhodanide and sodium hydroxide (60 percent by weight and 5 percent by weight, respectively). The polymer solution is heated to 75° C. until the polymer gelled (turned to dark red-brown) and then redissolved (honey-yellow color). The thus formed copolymer is precipitated by water and is a highly swellable multiblock copolymer (about 97 percent by weight of water) consisting of 11 mole percent of acrylonitrile, 52 mole percent of acrylamide and 37 mole percent of sodium acrylate. The solution is cooled and extruded into water to form a membrane about 0.5 mm. thick in a swollen state. The swollen membrane is washed and exposed on one side to a 10 percent nitric acid solution.

The membrane contracted as whole (the sodium acrylate is converted into acrylic acid) and a skin of yellow, turbid, non-swellable polymer about 0.1 mm. thick is formed on the exposed side. Analysis of the skin revealed a multiblock copolymers of acrylonitrile-glutarimide-acrylamide (19.7 mole percent acrylonitrile; 66.8 mole percent of glutarimide; 13.4 mole percent of acrylamide; 0.1 mole percent of acrylic acid) with an average molecular weight of the acrylonitrile sequences of 550. The membrane is fixed in a frame and dried.

The membrane is treated with an alcoholic solution of hexamethylene diamine whereby hydrophobic layer is cross-linked with free amino groups with concomitant increase in swelling capacity. The presence of free amino groups are convenient for bonding various active compounds, such as enzymes.

Numerous modifications and variations of the present invention are possible in light of the above teachings and, therefore, within the scope of the appended claims, the invention may be practiced otherwise than as particularly described.

What is claimed:

1. A novel block copolymer of a molecular weight of from 10,000 to 2,000,000 comprised of acrylonitrile sequences and sequences comprised of at least about 50 mole percent acrylamide units and functional units derived from glutarimide units and selected from the group consisting of carboxyl ester, hydrazide and hydroxylamide units, said acrylomile sequences having a molecular weight of at least 400, said sequence of said acrylamide and said functional units having a molecular weight of at least 400.

2. The block copolymers as defined in claim 1 wherein said molecular weight is from 40,000 to 550,000.

3. The block copolymer as defined in claim 1 or 2 wherein said molecular weight of said acrylonitrile sequences is preferably at least 600 and said molecular weight of said sequences comprised of acrylamide units and said functional units is preferably at least 750.

4. The block copolymer as defined in claim 3 wherein there are at least two acrylonitrile sequences and at least two of the sequences comprised of acrylamide units and said functional units.

5. The block copolymer as defined in claim 4 wherein there are preferably at least five sequences.

6. The block copolymer as defined in claims 4 or 5 wherein said acrylonitrile sequences equal the sequences comprised of acrylamide units and said functional units.

7. The block copolymer as defined in claims 1 or 2 wherein said acrylonitrile sequences comprises from 1 to 99 mole percent of said block copolymer.

8. The block copolymer as defined in claim 7 wherein said acrylonitrile sequences comprises from 50 to 95 mole percent of said block copolymer.

9. The block copolymer as defined in claim 7 wherein said acrylonitrile sequences comprises from 1 to 50 mole percent of said block copolymer composition.

10. A process for producing a block copolymer comprised of acrylonitrile sequences and sequences comprised of at least about 50 mole percent acrylamide units and up to 50 mole percent of units selected from the group consisting of carboxyl, ester, amide, hydrazide and hydroxylamide units, which comprises:
   (a) contacting a block copolymer comprised of acrylonitrile and glutarimide sequences with a low molecular weight compound having a functional group selected from the group consisting of hydroxyl, primary amino, secondary amino, hydrazo and hydroxylamino group at a pH acid of at least about 7.5 and at a temperature of between 0° and 185° C. for a time sufficient to effect conversion of said glutarimide units; and
   (b) recovering said block copolymer comprised of acrylonitrile sequences and sequences comprised of at least about 50 mole percent acrylamide units and up to 50 mole percent of units selected from the group consisting of carboxyl, ester, amide, hydrazide and hydroxylamide units.

11. The process for forming the block copolymer as defined in claim 10 wherein step (a) is preferably effected at a temperature of from 15° to 65° C.

12. The process for forming the block copolymer as defined in claim 10 wherein said block copolymer comprised of acrylonitrile and glutarimide sequences includes acrylic acid units.

13. The process as defined in claim 10 wherein said block copolymer of step (b) is recovered by evaporation.

14. The process as defined in claim 10 wherein said block copolymer of step (b) is recovered by neutralization.

15. The process as defined in claim 10 wherein said block copolymer of step (b) is recovered by extraction with a liquid in which said block copolymer is immiscible.

* * * * *